United States Patent [19]
Allen et al.

[11] Patent Number: 5,671,370
[45] Date of Patent: Sep. 23, 1997

[54] ALTERNATING DATA VALID CONTROL SIGNALS FOR HIGH PERFORMANCE DATA TRANSFER

[75] Inventors: Michael Scott Allen, Austin; Ravi Kumar Arimilli, Round Rock; John Michael Kaiser, Cedar Park; William Kurt Lewchuk, Austin, all of Tex.

[73] Assignee: International Business Machines Corporation, Armonk, N.Y.

[21] Appl. No.: 622,651

[22] Filed: Mar. 25, 1996

Related U.S. Application Data

[63] Continuation of Ser. No. 326,190, Oct. 3, 1994, abandoned.
[51] Int. Cl.$^6$ .................................................. G06F 3/00
[52] U.S. Cl. ......................... 395/305; 395/306; 395/551
[58] Field of Search ................................. 395/287, 305, 395/306, 551

[56] References Cited

U.S. PATENT DOCUMENTS

| | | |
|---|---|---|
| 3,912,947 | 10/1975 | Buchanan . |
| 4,099,231 | 7/1978 | Kotok et al. . |
| 4,503,497 | 3/1985 | Krygowski et al. . |
| 4,570,220 | 2/1986 | Tetrick et al. . |
| 4,710,893 | 12/1987 | McCutcheon et al. . |
| 4,785,394 | 11/1988 | Fischer . |
| 4,961,140 | 10/1990 | Pechanek et al. ............... 395/285 |
| 5,019,965 | 5/1991 | Webb, Jr. et al. . |
| 5,029,124 | 7/1991 | Leahy et al. ..................... 395/285 |
| 5,056,015 | 10/1991 | Baldwin et al. . |
| 5,113,514 | 5/1992 | Albonesi et al. . |
| 5,251,308 | 10/1993 | Frank et al. . |
| 5,253,296 | 10/1993 | Castleberry, Jr. et al. ........ 380/36 |
| 5,261,109 | 11/1993 | Cadambi et al. . |
| 5,313,594 | 5/1994 | Wakerly . |
| 5,327,570 | 7/1994 | Foster ............................... 395/800 |
| 5,428,753 | 6/1995 | Kondo et al. ..................... 395/287 |

FOREIGN PATENT DOCUMENTS

0524683A1  1/1993  European Pat. Off. ......... G06F 13/40

OTHER PUBLICATIONS

IBM TDB Bulletin, "Address Pipelining with a Flexible Control Mechanism for Shared Bus Protocols," vol. 37 No. 06A, Jun. 1994, pp. 147–148.

IBM TDB Bulletin, "Magnetic Media Bus", vol. 36, No. 10, Oct. 1993, pp. 3–6.

IBM TDB Bulletin, "Local Transfer Bus Architecture for Personal Computer Control Adapters," vol. 36, No. 08, Aug. 1993, pp. 521–524.

IBM TDB Bulletin, "Improved Store–Thru Cache", vol. 34, No. 1, Jun. 1991, pp. 370–374.

IBM TDB Bulletin, "Monitoring of Computer Systems Input/Output Bus Functions," vol. 33, No. 7, Dec. 1990, pp. 465–467.

IBM TDB Bulletin, "High–Speed System I/O Bus Used to Connect A Processor to Multiple I/O Bus Controller Chips," vol. 33, No. 3A, Aug. 1990, pp. 419–423.

IBM TDB Bulletin, "Bus Data Transfer Controls for Personal Computers", vol. 30, No. 7, Dec. 1987, pp. 455–456.

*Primary Examiner*—Jack B. Harvey
*Assistant Examiner*—Jeffrey K. Seto
*Attorney, Agent, or Firm*—Mark E. McBurney

[57] ABSTRACT

A system and method which utilizes a unique bus protocol in conjunctions plural Dval_ control signals to minimize the dead time between blocks of data being transferred between components is a data processing system. The present invention introduces another latch-to-latch data valid control signal and alternates the usage of this signal during back to back data transfers from the same or different bus devices. In this manner the restore and tristate dead cycles are totally overlapped with the data transfer and the minimum possible number of dead cycle(s) is achieved between different blocks of data transfers. With the method of the present invention, data providers alternately activate the Dval_ signals and data receivers look at all Dval_ signals and if any one of them is active, then the data is considered valid and can be read.

17 Claims, 4 Drawing Sheets

ALTERNATING DATA VALID CONTROL SIGNALS FOR HIGH PERFORMANCE DATA TRANSFER

CROSS REFERENCE TO RELATED APPLICATIONS

This is a continuation of application Ser. No. 08/326,190 filed Oct. 3, 1994 now abandoned.

"Dual Latency Status and Coherency Reporting for A Multiprocessing System", U.S. Ser. No. 08/316,980, filed Oct. 3, 1994.

"System and Method for Determining Source of Data in a System with Intervening Caches", U.S. Ser. No. 08/371,256, filed Oct. 3, 1994.

"Queued Arbitration Mechanism for Data Processing System", U.S. Ser. No. 08/317,006, filed Oct. 3, 1994.

"Method and Apparatus for Remote Retry in a Data Processing System", U.S. Ser. No. 08/316,978, filed Oct. 3, 1994.

"Array Clocking Method and Apparatus for Input/Output Subsystems", U.S. Ser. No. 08/316,976, filed Oct. 3, 1994.

"Data Processing System Having Demand Based Write Through Cache with Enforced Ordering", U.S. Ser. No. 08/361,979, filed Oct. 3, 1994.

"Coherency and Synchronization Mechanisms for I/O Channel Controllers in a Data Processing System", U.S. Ser. No. 08/316,977, filed Oct. 3, 1994.

"Low Latency Error Reporting for High Performance System Bus", U.S. Ser. No. 08/326,203, filed Oct. 3, 1994; and "Efficient Address Transfer Technique for a Data Processing System", U.S. Ser. No. 08/317,007, filed Oct. 3, 1994.

BACKGROUND OF THE INVENTION

1. Field of the Invention

The present invention generally relates to the transfer of data between components in a shared bus data processing system. More specifically, plural data valid signals are provided and all data receivers in the system are capable of monitoring these data valid signal lines. If any of the data valid signal lines are active, then the data receiver knows that the information on the data bus is valid. Providing multiple data valid signals allows the restore and tristate cycles, found in data processing systems with single data valid signal lines, to be eliminated.

2. Description of Related Art

Typically, data processing systems include a single data valid signal which is activated by a data provider after the data is placed on the bus. The standard protocol requires one cycle to actively "restore" the control signal to an inactive level and then another cycle to "tristate" the control signal in order to avoid driver contention by the next data bus device. Therefore, conventional data processing systems have at least two cycles between the end of one data transfer and the beginning of the next data transfer by another bus device (see the FIG. 2).

In some systems, the Generation of the "active restore" and "tristate" level of the data valid control signal is performed in one cycle, but the system bus frequency is severely limited in theses types of systems. Thus, in both cases the overall data bus bandwidth is limited, either by an increased number of "dead" data bus cycles, or significantly reduced data bus frequency.

Most modern system buses which support multiprocessors, normally include a separate system, address and data bus. The data bus portion of these system buses is an extremely critical resource and directly affects the overall system performance. Thus, there is a need in the art for a more efficient data transfer mechanism which maximizes the realizable data bus bandwidth.

SUMMARY OF THE INVENTION

In contrast to the prior art, the present invention provides a bus protocol which utilizes plural data valid (Dval_) control signal in a latch-to-latch structure to minimize the dead time between data block transfers from different bus devices. Further more, the plural Dval_ control signal operated in a latch-to-latch fashion to maximize the data bus frequency.

Broadly, the present invention introduces another latch-to-latch data valid control signal and alternates the usage of this signal during back-to-back data transfers from the same-or different bus devices. In this manner the restore and tristate dead cycles are totally overlapped with the transfer of data, and the minimum possible transfer time is achieved between sequential data transfers. Of course, a single clock cycle is needed between the blocks of data being transferred to ensure that data contention on the data bus does not occur. With the method of the present invention, data providers alternately activate the Dval_ signals and data receivers look at both Dval_ signals and if either one of them is active, then the data is considered valid and can be sampled/read.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
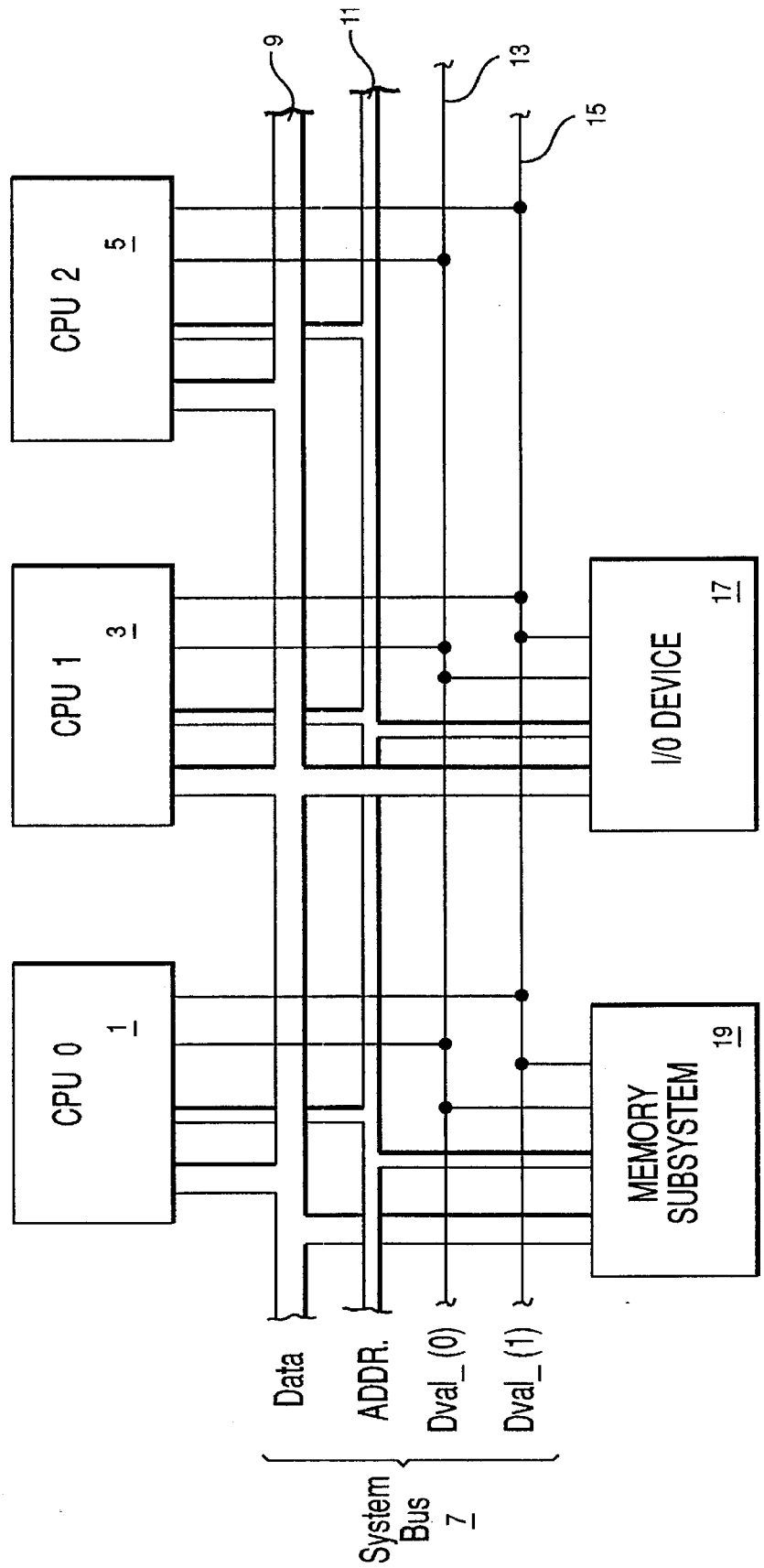
FIG. 1 is a block diagram of a data processing system including multiple processors and peripheral devices including the plural Dval_ signal lines and protocol of the present invention.

Referring to FIG. 1, a data processing system is shown and includes multiple processors 1, 3 and 5 each connected to a system bus, generally noted by reference numeral 7. It should be noted that while FIG. 1 shows a multiprocessing (MP) system the present invention will apply equally to data processing systems having a single processor, or any other system wherein data is transferred between components, such as a video adapter card wherein data is transferred between a video random access memory (VRAM) and a video control processor.

System bus 7 includes data bus 9 which transfers the actual bits of data between the components of the data processing system. In a preferred embodiment data bus 9 will have a width of 128 bits, however, it should be understood that the present invention contemplates data buses having many different widths. Address bus 11 transfers the addresses of the location where the desired data is being stored. For example, during a load operation processor 1 will place the address, on address bus 11, of the location currently storing the data to be loaded into the processor. Normally, the data will be stored in a memory subsystem 19 and a memory controller will recognize the address, retrieve the data and place it on data bus 9. In this manner, processor (s) 1, 3 and 5 can obtain data currently stored in memory. Additionally, data may be stored or input from a peripheral device, such as input/output (I/O) device 17. Again, during a load operation the requesting processor will place an address on address bus 11 and the I/O device will recognize the address and provide the data on data bus 9.

Further, data may be stored or input from the cache of another processor. Again, during a load operation, the requesting processor will place an address on address bus 11 and another processor, e.g. CPU 3, will recognize the address and provide the data on data bus 9.

The present invention also contemplates the situation where at least one of the CPUs 1, 3 and 5 store data in memory subsystem 19 or I/O device 17. More particularly, the CPU will place an address on bus 11 indicating where the data is to be stored. For example, a memory controller in memory subsystem 19 recognizes the address as one in the memory which it controls. The processor will place the data on data bus 9, and the memory will read the data from data bus 9 and modify the appropriate memory location. The data is then read from data bus 9.

As noted above, conventional data processing systems include a single data valid signal. However, it can be seen from FIG. 1 that the present invention includes a first data valid signal line 13 (Dval__(0)) and at least a second valid signal line 15 (Dval__(1)). By including two data valid signals the present invention saves bus bandwidth time by allowing the Dval__ signals, driven by the data providing devices, to be overlapped. This provides an active data valid signal, which can be read by the data receiving device, earlier than possible with prior art systems. Therefore, the present invention completes the data transfer faster than is currently possible with conventional processing systems.

Figure 3:
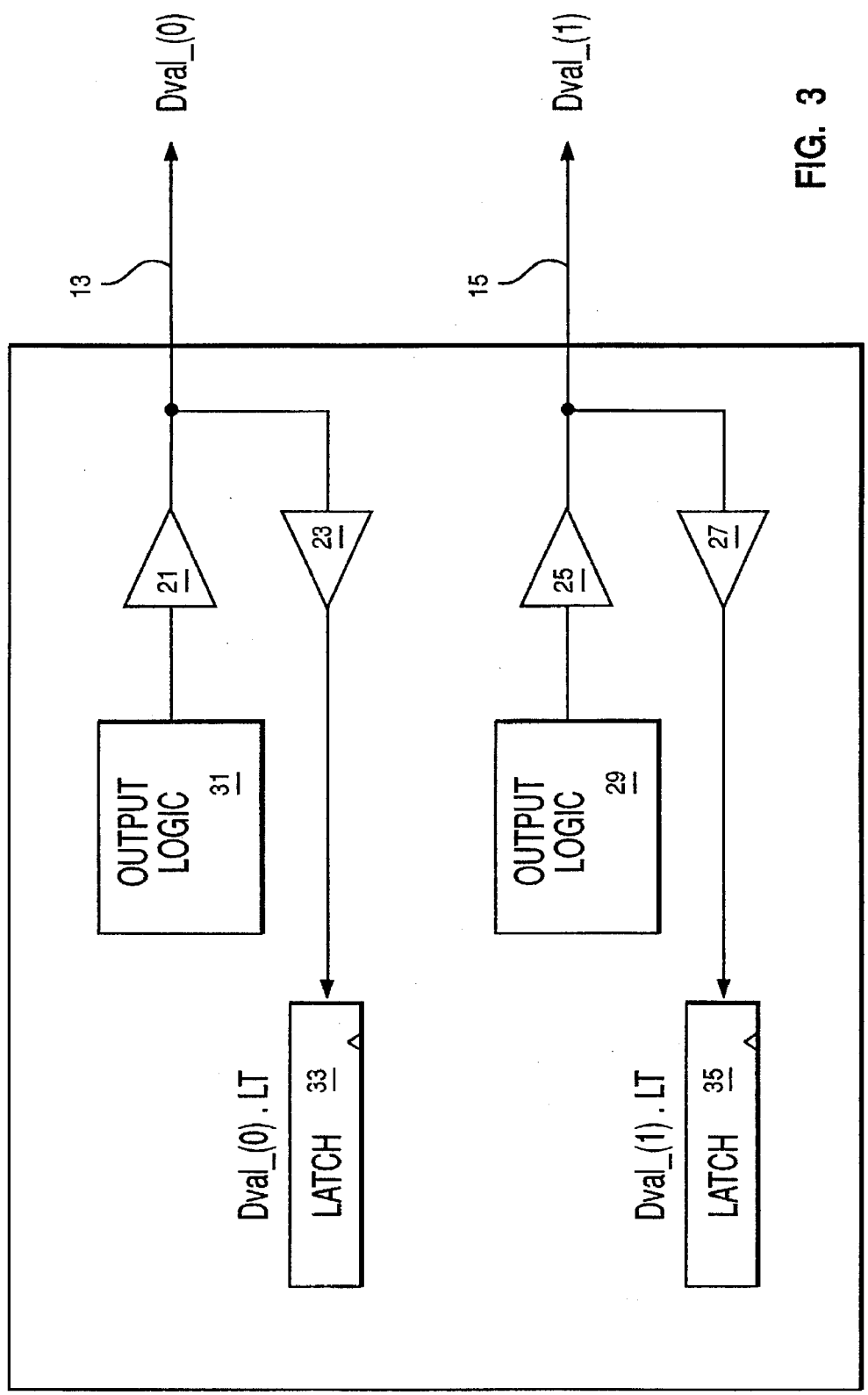
FIG. 3 is a block diagram showing the portion of a bus device with interfaces with the plural Dval control signals of the present invention.

FIG. 3 is a block diagram of the components of memory 19 which control the Dval__ signals. Memory 19 is described as an example, however, any device connected to bus 7 which transfers data will operate in the same manner when using the present invention. Dval__(0) signal 13 is connected to a receiver circuit 23, which then places the Dval__(0) signal into latch 33. The value in latch 33 is Dval__(0).LT, i.e. the latched value of Dval__(0). Similarly, Dval__(1) is input to a receiver 27 which places Dval__(1) into latch 35 and captures the signal as Dval__(1).LT. Memory 19 then reads the Dval__(0).LT and Dval__(1).LT to determine if data being transferred to the memory is valid. Memory 19 will also drive the Dval__ signals when outputting data to other devices connected to system bus 7. Output logic 31 and 29 activate Dval__(0) and Dval__(1), respectively, when data is being transferred from memory 19 to data receiving devices, such as CPUs 1, 3 and 5. Drivers 21 and 25 drive Dval__(0) and Dval__(1), respectively, low when data if placed on bus 9. The process by which output logic 31 and 29 controls the Dval__ signals will be described below in conjunction with FIG. 5.

Figure 4:
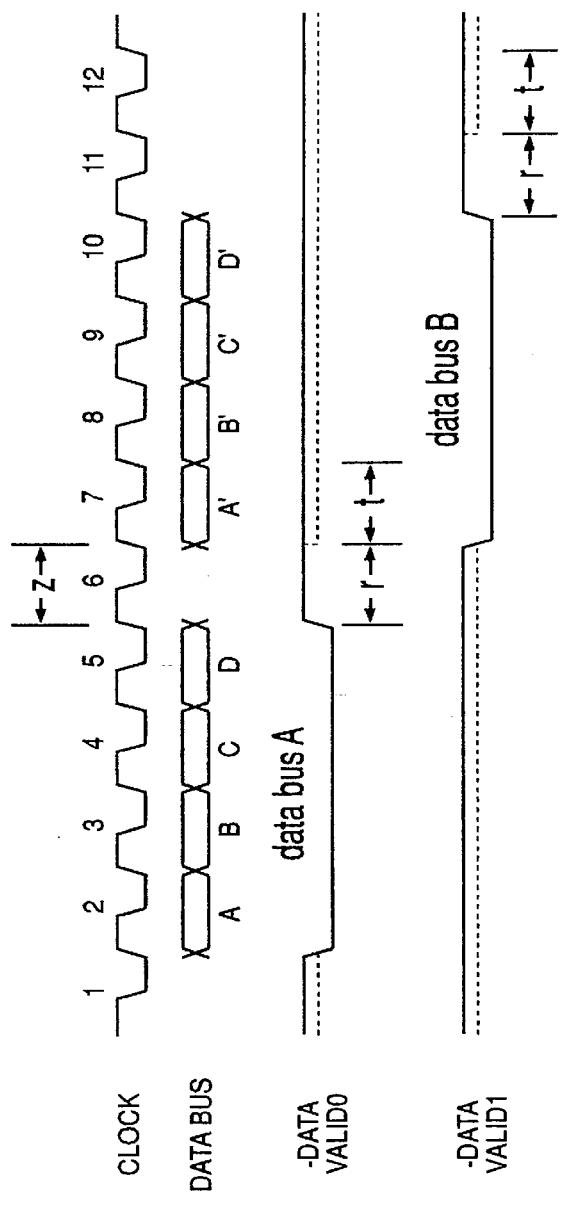
FIG. 4 is a timing diagram illustrating the control signals and protocol used by a system implementing the alternate data valid control protocol of the present invention.

The operation of the present invention will now be described with regard to FIG. 4. A clock signal is shown which provides the synchronization between the devices connected to system bus 7. In the preferred embodiment of the present invention, data is transferred in four (4) packets, or "beats" on data bus 9. As noted above, the preferred data bus will be 128 bits wide, thus, four packets of 128 bit data (512 bits) can be transferred over a four cycle period. The data provider drives the data packets onto data bus 9. Each data provider in the processing system, such as CPUs 1, 3, 5, memory 19, I/O device 17, or the like will include driver circuitry which will force the data bus to the specific combination of 1s and 0s (voltage or absence of voltage, respectively) that represent the data. Therefore it can be seen that in order to ensure the reliability of these driver circuits, data contention on bus 9 must be avoided. The data transfer protocol of the present invention requires a single cycle "z" to be inserted between data being driven on the bus by different processing elements, having different driver circuits. If even a small amount of overlap existed, then the situation where one driver circuit was driving a bit low (to logical 0) and another driver circuit was driving the same, bit high (to logical 1) could cause damage to the drivers resulting in premature failure of the system. Referring to FIG. 4, it can be seen that data packets A, B, C and D are driven on the data bus in cycles 2 through 5 and ends at, cycle 5 when the corresponding data provider (bus device A) ceases driving data packet D onto the bus. No data is placed on the bus during the intermediate cycle 6. Beginning at cycle 7 data A', B', C' and D' from a different data provider (bus device B) is placed on bus 9. If the new data A', B', C', and D', were driven onto bus 9 beginning at cycle 6 (e.g. if the intermediate cycle were eliminated), it is highly likely that there would still be some overlap of the data (i.e. data packet D and data packet A'). Even an extremely short period of overlap, such as one nanosecond is unacceptable. Therefore, in order to ensure system availability and reliability, the bus protocol of the present invention inserts intermediate cycle "z" to avoid contention between the driver circuits of the data providers.

FIG. 4 also shows data valid signals Dval__(0) and Dval__(1), which are both negative active signals, i.e. they are in their active state when low (at logical 0). An example of the present invention will be described with regard to FIG. 3. For data A, B, C and D, Dval__(0) is activated by bus master A, the provider of data A, B, C and D, beginning at cycle 2. Dval__(0) remains active for all four data packets from this particular data provider. Those skilled in the art will understand that a data valid signal is controlled by the bus device providing the data (CPU, memory, I/O, or the like) and is activated when the data is written to the data bus. Once the data valid signal is activated by the bus master, then the data receiver reads this signal and knows that the data provider has placed the data on the bus and it can be read.

In the example illustrated by FIG. 4, data bus device B places data A', B', C' and D' on data bus 9 beginning at cycle 7. These four data packets remain on bus 9 through cycle 10. However, data bus device B drives Dval__(1) active, rather than waiting for Dval__(0) to become stable subsequent to the restore "r" and tristate "t" cycles. This allows Dval__(1) to become active sooner than if bus master B had been forced to wait for the restore and tristate cycles to return a single data valid line to a state where it can be reliably activated.

In the system of the present invention, the data receiving device looks at either Dval__(0) and Dval__(1) and if either signal is active, then the data is considered to be valid. In particular, the present invention as shown in FIG. 4 uses negative active signals for Dval_(0) and Dval_(1). The data receiving device performs a logical "AND" operation between the Dval_(0) and Dval_(1) signals. That is, memory 19 of FIG. 3 would perform a logical "AND" operation between the latched Dval_signals (Dval_(0).LT and Dval_(1).LT). For example, at cycle 2 the data receiving device performs a logical "AND" operation between Dval_(0) and Dval_(1). At this point in time, Dval_(0) is active logical "0") and Dval_(1) is inactive (logical "1"). Since "0" AND "1" is "0", then the data valid signal is active because negative active logic is being utilized in this embodiment. Further, at cycle 6 when both Dval_(0) and Dval(1) are inactive (logical "1") it can be seen that the data valid signal will be inactive because "1" AND "1" is "1", which is inactive for negative active logic. As discussed previously, cycle 6 is the buffer cycle that must be inserted between data transfers to avoid driver contention. At cycle 8, for example, it can be seen that Dval_(0) is now inactive (logical "1") and Dval_(1) is active (logical "0"). Since "1" and "0" is "0", the data valid signal is once again considered active. Thus, if either of the data valid signals are active, then the data on bus 9 is considered valid and can be read. This allows data to be transferred faster than currently possible with systems using a single data valid signal. The previous example was described using negative active logic wherein DVal_(0) and Dval(1) were "ANDed" together to determine if either were active. However, many other logic schemes are contemplated by the present invention, such as positive active Dval signals wherein a logical "OR" operation will be used to determine if either Dval_ signal is active.

Figure 2:
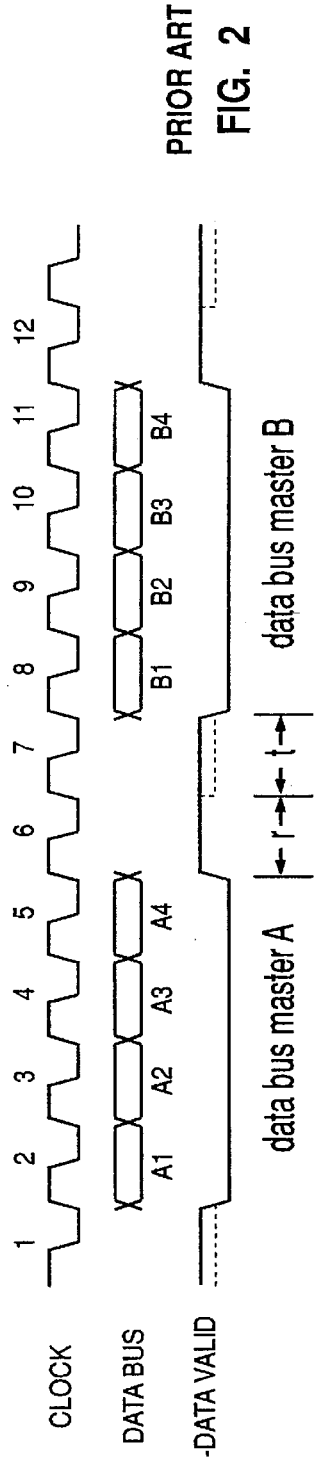
FIG. 2 is a timing diagram showing the sequence of events occurring in a data transfer operation of a prior art system.

Specifically, with the prior art system of FIG. 2, it can be seen that data A1, A2, A3 and A4 is transferred from bus device A to the data receiver in four cycles 2 through 5. Additionally, restore cycle "r" and tristate cycle "t" are required before the bus is returned to a state where data can be read therefrom. Thus, it takes six cycles in order that four data packets can be transferred to the data receiver. In contrast, the present invention provides data A, B, C and D in cycles 2 through 5, and only requires a single cycle "z" to restore the data bus such that data from bus device B can place data A', B', C' and D' on bus 9 beginning at cycle 7. Therefore, the present invention requires only five cycles to transfer four packets of data which substantially increases performance (on the order of 20%).

The present invention totally hides the active restore "r" and tristate "t" cycles of the previous Dval_ control signal. The active restore and tristate cycles of the Dval_ signals are overlapped with the data transfer. The minimum possible dead time ("z") between back-to-back data bus owners is achieved by the present invention. With this method the receiver of the data simply determines if either Dval_ signal is active ("ANDs" the latched version of the Dval_(1) and Dval_(0) signals for negative logic and "ORs" the signals for positive logic) to create the internal latched data valid indication. Therefore, the data receiver will be required to include a small amount of logic that will determine whether either of the Dval_ signal are valid. Also, the following protocol is implemented by the present invention. If the latched version of Dval_(0) is active when the first beat of data is to be driven, then the bus master activates Dval_(1). And, if the latched version of Dval_(0) is inactive when the first beat of data is to be driven, then the bus device activates Dval_(0).

Figure 5:
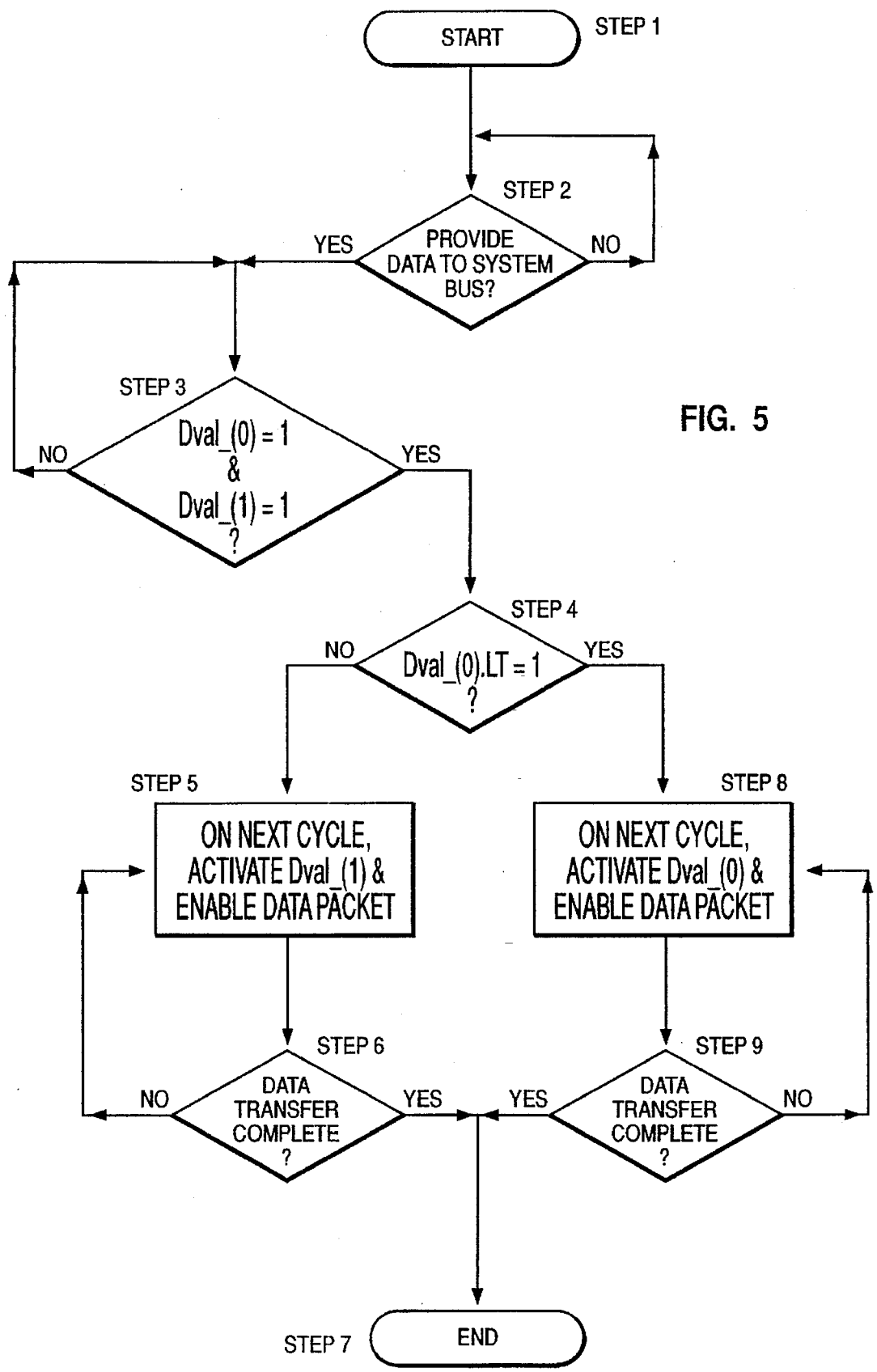
FIG. 5 is a flow chart of the process implemented by the present invention to transfer data using plural data valid control signals.

FIG. 5 is a flow chart showing the previously described protocol. This method shows the steps required where at step 1, the process is started and step 2 determines if data is to be provided to another device on the bus. It should be noted that step 2 includes gaining access to the bus based on recognizing a request for data from another device and then arbitrating for control of the bus, and the like. If step 2 determines that there is no data to be provided, then the process returns to step 1 and waits until data is to be transferred. If at step 2, it is determined that there is data to be provided to the bus, the method continues to step 3 where it is determined if both Dval_(0) and Dval_(1) are equal to 1 (in their inactive state, since negative logic is being used in a preferred embodiment). This will be true when there are no current data transfer operations being performed, or during the "z" cycle (cycle 6 of FIG. 4, inserted to ensure that no driver contention will occur) between blocks of data being transferred. If it is determined that Dval_(0) and Dval_(1) are not both inactive (equal to logical 1), then the method loops back and waits until this condition is true, i.e. that the data bus is available. When Dval_(0) and Dval_(1) are both equal to logical 1, the process continues to step 4 which determines if the latched value of Dval_(0).LT is equal to 1. That is, the value in latch 33 of FIG. 3 is inactive. If this value is not equal to 1, then on the next machine cycle, the data provider activates Dval_(1) and enables the data being transferred. It can be seen from FIG. 4, that this will alternate the Dval_ signals controlled by the data provider. In this manner, the data provider knows to activate whichever Dval_ signal (Dval_(0) or Dval_(1)) is not being used. For example, during cycles 2-5 of FIG. 4, the Dval_(0) signal is not equal to 1. If memory 19 was another data provider, it would then know to activate Dval_(1) on the next cycle (beginning at cycle 7 of FIG. 4). Subsequent to step 5, the process of the present invention determines whether the data transfer is complete, i.e. are there other packets of data to transfer? If so, the process loops back to step 5. However, if the data transfer is complete, the process continues to step 7 and ends.

If it is determined at step 4 that Dval_(0).LT is equal to 1 and inactive (as in the case during cycles 7–10 of FIG. 4), then the method of the present invention continues to step 8 and activates Dval_(0) and enables the data to be transferred. Step 9 then determines if there is data left to transfer. If so, the process returns to step 8 and continues. However, if there are no more data packets to transfer, then the process continues to step 7 and ends.

Additionally, alternating between two "bussed" control signals (signals connected to all devices in the system) also has usefulness in other applications, such at communication transfer. Basically, the present invention could be extended to allow high speed transfer of address, data or control information between multiple devices on a shared bus.

The present invention has been described in connection with a shared data bus. However, it should be understood that the scope of the present invention includes any type of shared bus designs for transfer of address information, control information, or the like. Thus, the present invention is not limited to data transfer on a shared data bus.

Although certain preferred embodiments have been shown and described, it should be understood that many changes and modification may be made therein without departing from the scope of the appended claims.

We claim:

1. A method of transferring data between devices in a data processing system connected by a system bus, comprising the steps of:

providing at least first and second data valid signals on first and second data valid lines in said system bus;

placing first data from a first providing device on said system bus, and activating said first data valid signal on said first data valid line;

placing second data from a second providing device on said system bus, and activating said second data valid signal on said second data valid line; and reading said first or second data, by a receiving device, when either said first or second data valid signal is active.

2. A method according to claim 1 further comprising the steps of:

determining, by said first providing device prior to placing said first data on said system bus, whether said system bus is currently being used; and determining, by said second providing device prior to placing said second data on said system bus, whether said system bus is currently being used.

3. A method according to claim 2 wherein said step of placing first data further comprises the step of:

activating said first data valid signal when said second data valid signal is currently inactive.

4. A method according to claim 3 wherein said step of placing second data further comprises the step of activating said second data valid signal when said first data valid signal is currently inactive.

5. A method according to claim 4 further comprising the steps of:

placing third data from a third data providing device on said system bus one machine cycle after said data is read by said second device; and activating, by said third data providing device, either said first or second data valid signals one machine cycle after the other of said first or second data valid signals is deactivated.

6. A method according to claim 4 wherein said step of placing second data comprises the steps of:

providing said second data on said system bus one machine cycle after said data is read by said second device; and activating, by said second providing device, said second data valid signal one machine cycle after said first data valid signal is deactivated.

7. A method according to claim 6 wherein said step of reading comprises the steps of:

storing each said first and second data valid signals in a latch; and determining if either of said data valid signals is active.

8. A method according to claim 7 wherein said step of determining if either of said data valid signals is active comprises the steps of:

for negative active data valid signals, performing art AND operation between the first and second data valid signals; and for positive active data valid signal, performing an OR operation between the first and second data valid signals.

9. A data processing system that transfers data between devices connected by a system bus, comprising:

means for providing at least first and second data valid signals on first and second data valid lines in said system bus;

means for placing first data from a first providing device on said system bus, and activating said first data valid signal on said first data valid line;

means for placing second data from a second providing device on said system bus, and activating said second data valid signal on said second data valid line; and means for reading said first or second data, by a receiving device, when either said first or second data valid signal is active.

10. A system according to claim 9 further comprising:

means for determining, by said first providing device, whether said system bus is currently being used; and means for determining, by said second providing device, whether said system bus is currently being used.

11. A system according to claim 10 wherein said means for placing first data further comprises means for activating said first data valid signal when said second data valid signal is currently inactive.

12. A system according to claim 11 wherein said means for placing second data further comprises means for activating said second data valid signal when said first data valid signal is currently inactive.

13. A method according to claim 12 further comprising:

means for placing third data from a third data providing device on said system bus one machine cycle after said data is read by said second device; and means for activating, by said third data providing device, either said first or second data valid signals one machine cycle after the other of said first or second data valid signals is deactivated.

14. A system according to claim 12 wherein said means for placing second data comprises:

means for providing said second data on said system bus one machine cycle after said data is read by said second device; and means for activating, by said second providing device, said second data valid signal one machine cycle after said first data valid signal is deactivated.

15. A system according to claim 14 wherein said means for reading comprises:

means for storing each said first and second data valid signals in a latch; and means for determining if either of said data valid signals is active.

16. A system according to claim 15 wherein said means for determining if either of said data valid signals is active comprises:

means for performing an AND operation between the first and second data valid signals when said data valid signals are negative active; and means for performing an OR operation between the first and second data valid signals when said data valid signals are positive active.

17. A system according to claim 16 wherein said means for placing data on said system bus comprises a driver circuit.

* * * * *